March 2, 1965    C. A. SERRIADES    3,172,116
INDUCED LIFT COMBINATION AIRCRAFT
Filed Jan. 2, 1964    5 Sheets-Sheet 1
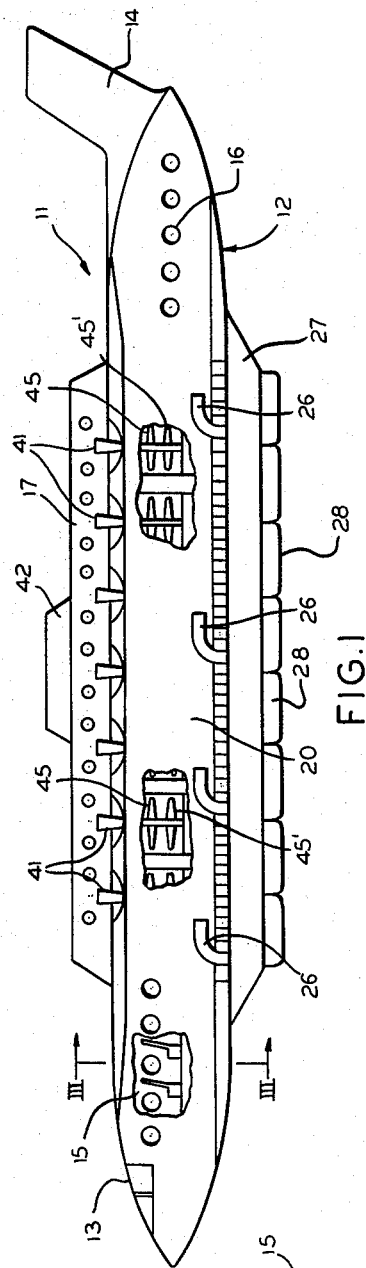
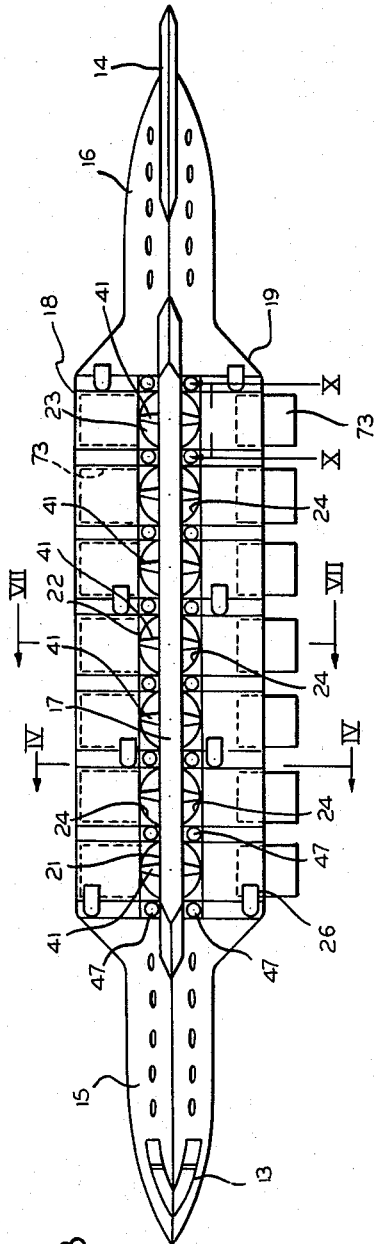
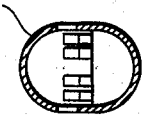
*INVENTOR.*
CONSTANTINE A. SERRIADES
BY
ATTORNEYS March 2, 1965  C. A. SERRIADES  3,172,116
INDUCED LIFT COMBINATION AIRCRAFT
Filed Jan. 2, 1964  5 Sheets-Sheet 2

INVENTOR.
CONSTANTINE A. SERRIADES
BY
ATTORNEYS

March 2, 1965 C. A. SERRIADES 3,172,116
INDUCED LIFT COMBINATION AIRCRAFT
Filed Jan. 2, 1964 5 Sheets-Sheet 3

INVENTOR.
CONSTANTINE A. SERRIADES
BY
ATTORNEY

March 2, 1965  C. A. SERRIADES  3,172,116
INDUCED LIFT COMBINATION AIRCRAFT
Filed Jan. 2, 1964  5 Sheets-Sheet 4

INVENTOR.
CONSTANTINE A. SERRIADES
BY
ATTORNEYS

March 2, 1965 C. A. SERRIADES 3,172,116
INDUCED LIFT COMBINATION AIRCRAFT
Filed Jan. 2, 1964 5 Sheets-Sheet 5

INVENTOR.
CONSTANTINE A. SERRIADES
BY
ATTORNEYS

United States Patent Office

3,172,116
Patented Mar. 2, 1965

3,172,116
INDUCED LIFT COMBINATION AIRCRAFT
Constantine A. Serriades, 3950 N. Lake Shore Drive,
Apt. 2300, Chicago, Ill.
Filed Jan. 2, 1964, Ser. No. 335,149
18 Claims. (Cl. 244—12)

This invention generally relates to a combination aircraft and more particularly relates to an improved combination aircraft which has both a vertical lift and supersonic forward propulsion.

Generally, an aircraft is vertically lifted off the ground by directing a stream of air towards the ground which produces an opposite upward force to lift the aircraft. Many types of combination aircraft have been proposed and operated that rely mainly on this type of lifting force, which is produced by a helicopter type propeller or by the thrust forces of jet engines, to vertically raise and lower the aircraft. The use of such direct lifting forces is insufficient and inefficient as well as difficult for adaption into an aircraft where it is desired not only to vertically move the aircraft but also propel it at high altitudes at supersonic speed. Previous combination aircrafts utilized the principle of pivotal engines that were pivoted to provide either vertical thrust or horizontal type thrust and also utilized the principle of separate engine means for providing the lifting thrust and the forward forces. These combination aircrafts however were inefficient and it was difficult to modify their principle of operation for large transport type aircraft. The present invention substantially eliminates the above problems by providing a combination aircraft that does not directly use the thrust of the aircraft engines to vertically actuate the aircraft.

Therefore, it is an object of the present invention to provide a combination aircraft which is not verticaly actuated by the direct downward thrust of the aircraft engines.

Therefore, it is an object of the present invention to provide an improved combination aircraft.

It is another object of the present invention to provide an improved combination transport aircraft which is capable of vertical movement and supersonic forward movement.

It is another object of the present invention to provide an improved streamlined combination aircraft which contains a plurality of helicopter blades within a plurality of propeller cavities formed within the aircraft and a plurality of jet engines to propel aircraft in a forward direction.

It is another object of the present invention to provide an improved combination aircraft which utilizes a plurality of air directing means within cavities formed by the aircraft and means to direct air from the directing means transversely over the wings of the aircraft to allow the aircraft to move vertically.

It is another object of the present invention to provide a combination aircraft having wings with means to cause a pressure differential between the top and bottom surfaces of said wings whereby the aircraft is vertically moved.

It is still another object of the present invention to provide a combination aircraft having wings with means to cause a pressure differential between the top and bottom surfaces of said wings whereby the aircraft is vertically moved, a plurality of staggered jet engines on the wings of the aircraft to propel the aircraft forward at supersonic speeds, and a plurality of vertically positioned axial compressors utilized to feed compressed air to said jet engines.

It is another object of the present invention to provide an improved passenger aircraft having inflatable pontoon type landing and support means as well as vertical lift means and forward supersonic thrust means.

It is another object of the present invention to provide a passenger aircraft having inflatable pontoon type support means, a plurality of axially aligned propeller wells with the central well containing a jet propelled vapor condenser propeller and the other wells containing contrarotating jet helicopter propellers and said propellers being actuated by a plurality of vertically extending axial compressors which also feed a plurality of forward thrust jets.

It is still another object of the present invention to provide a vertical lift aircraft utilizing axially aligned propeller wells having contrarotating helicopter propellers in combination with a transverse directing vane having a plurality of pivotal directing vanes to direct air transversely over the wings of the aircraft.

Other features, objects and advantages of the present invention will become apparent to those skilled in the art after a careful consideration of the following detailed description when considered in conjunction with the accompanying drawings wherein like reference numerals and characters refer to like and corresponding parts throughout the several views.

In the drawings:

FIGURE 1 is an elevational side view with parts broken away illustrating a combination aircraft constructed in accordance with the principles of the present invention;

FIGURE 2 is a top plan view of the combination aircraft illustrated in FIGURE 1;

FIGURE 3 is a cross-sectional view taken along lines III—III of FIGURE 1;

As shown in the drawings:

Figures 4, 5:
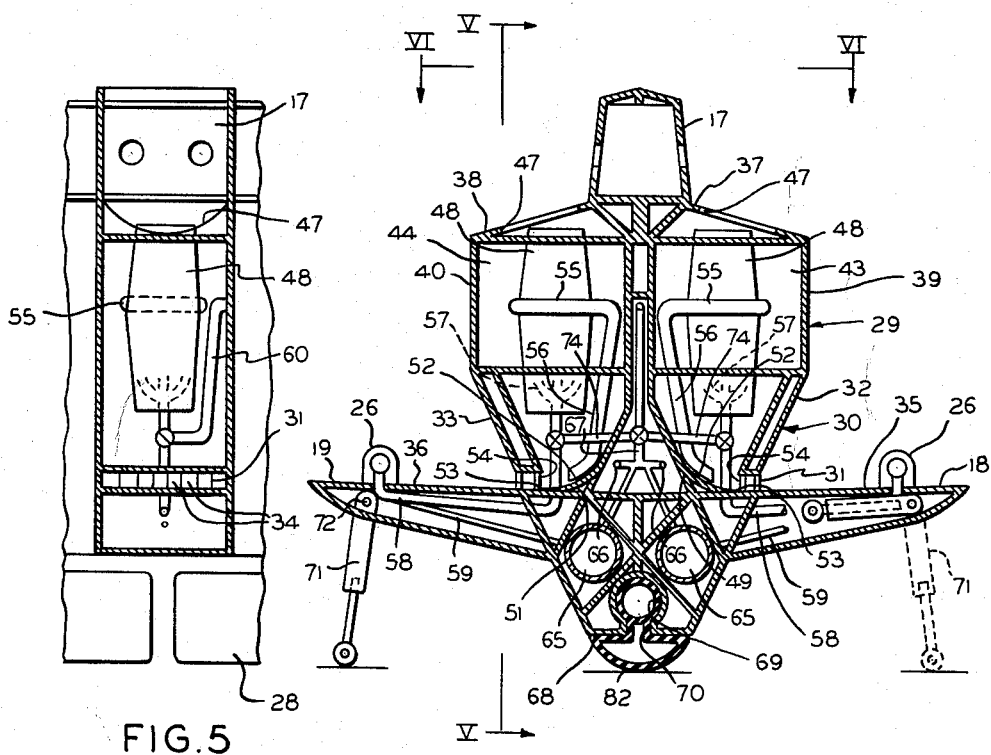
FIGURE 4 is a cross-sectional view with parts in elevation taken along lines IV—IV of FIGURE 2.
FIGURE 5 is a partial cross-sectional view taken along lines V—V of FIGURE 4.
Figure 6:
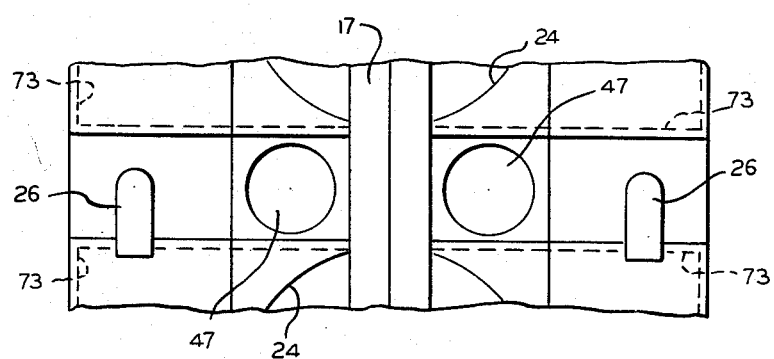
FIGURE 6 is a partial top view of the longitudinal cross-section illustrated in FIGURE 4.

Referring to FIGURES 1 and 2 there is illustrated the supersonic combination aircraft 11 constructed in accordance with the principles of the present invention.

The aircraft 11 has a fuselage 12 with a cockpit enclosure 13 at the forward end thereof and a rear vertical tail fin 14 at the rear end thereof. A pressurized passenger cabin 15 is formed in the front section of the fuselage, a pressurized passenger cabin 16 is formed in the rear section of the fuselage, and a pressurized passenger cabin 17 extends over the top of the fuselage. A pair of wings 18 and 19 extend from the bottom portion of the fuselage and a central fuselage portion 20 has a plurality of propeller wells or cavities 21, 22 and 23 formed therein. The wells extend vertically into the fuselage and have mouths 24 opening at the top thereof and have predetermined diameters that are substantially equal to the width of the fuselage.

A plurality of jet engines 26 are connected to the wings 18 and 19 to propel the aircraft in a forward direction and the aircraft is supported by a keel type structure 27 connected to the bottom of the fuselage and vertically extending downwards therefrom. The keel 27 has a plurality of pontoon supports 28 connected thereto.

Referring to FIGURES 1-4, the central fuselage portion 20 has an upper portion 29 and a lower portion 30 that converges from the upper portion onto the tops 35 and 36 of the wings. The lower portion 30 of the fuselage has mounted between the wings and each converging longitudinally extending side wall 32 and 33 of the lower portion a plurality of directing vanes 31 which may be pivotally connected if desired. The vanes form a plurality of directing passages 34 which are normally perpendicular to the longitudinal axis of the fuselage and are shaped to normally direct air transversely over the top surfaces 35 and 36 of the wings 18 and 19, respectively.

Top walls 37 and 38 of the fuselage converge inwardly from the upper portion side walls 39 and 40. The converging top walls 37 and 38 are connected to the central pressurized passenger cabin 17 which extends over the fuselage central portion 20 for a substantial length thereof. The pressurized passenger cabin 17 is connected to the fuselage by suitable support members 41. An auxiliary compartment 42 may be connected to the central portion of the pressurized compartment 17 if desired.

The fuselage central portion 20 is also divided into a plurality of compressor compartments 43 and 44. The compressor compartments extend on each side of the fuselage vertical centerline and there are at least two compressor compartments, one on each side of the fuselage vertical centerline between propeller wells 21, 22 and 23. The fuselage upper portion 29 has a width which is greater than the fuselage lower portion 30 in order to accommodate the large diameter of the propellers 45 and 46 which are rotatably mounted in the wells 21, 23 and 22, respectively. The propeller wells and the compressor compartments open into the atmosphere through appropriate openings 24 and 47, respectively, which are formed in the top walls of the fuselage. The compressor compartments 43 and 44 each contain an axial compressor means 48 which extends substatntially perpendicular to the top surfaces of the wings. Each axial compressor 48 has an atmosphere intake and compresses said air.

Referring to FIGURES 1-8, 10 and 11, extending longitudinally for the width of each of the compressor chambers 43 and 44 are two curved directing walls 49 and 51, respectively. The directing walls 49 and 51 are curved so that they present a longitudinal concave surface 52 that has one end 53 connected to the top surface of the wings adjacent the inner surface 54 of the directing vanes 31. Each of the compressors 48 has an exhaust collecting conduit means 55 which delivers the exhaust gases thereof to a conduit means 56 which projects the exhaust gases tangentially onto the curved concave surface 52 and through the directing vanes 31. Also, the compressors have a compressed air collector 57 which collects compressed air from the compressors and directs a portion of the compressed air to a suitable jet 26 by a conduit 58 where it is united with fuel being delivered to the jet 26 by a conduit 59 to provide propulsion forces. Also, by conduit 60 (FIGURE 5) the collector 57 may deliver compressed air to thrust augmenters 61 (FIG. 10) and 62 (FIG. 7) and to the jets 63 on the propellers in the propeller wells.

Any type of suitable axial compressor may be utilized in the present invention but it is preferred to utilize an axial compressor of the type which is described in my copending application Serial No. 307,444, filed on September 9, 1963.

The lower keel portion 27 of the aircraft beneath the wings has a frusto-triangular cross-section. The keel has the wings extending across the top thereof and is suitably connected to the fuselage by suitable means and has suitable reinforcing members 64. Longitudinally extending within the keel are a plurality of fuel tanks 65 which have connected thereto suitable conduits 59 for feeding fuel to the jet engines on the wings, conduits 66 for feeding fuel to the compressors, and conduits 67 for feeding fuel to the jet engines 63 on the jet propellers. The frusto-apex 68 (FIGURES 4 and 7) of the keel has a longitudinally extending segmented spherical passage 69 extending the length thereof and which forms a reduced neck portion 70 for the segmented spherical passage. Suitably connected within the segmented spherical passage 69 and the keel are a plurality of longitudinally extending pontoon support members 28 as will hereinafter be described in greater detail.

Each wing may have a plurality of suitable retractable landing gear support members 71 (FIGURE 4) which are pivotally connected at 72 to the ends of the wings and are used to stabilize the stationary aircraft. The wings of the aircraft may also have a plurality of retractable wing members 73 (FIGURES 2, 7 and 8) therein that may be extended when it is desired to vertically raise or lower the aircraft and which are retracted when the aircraft is flying at supersonic forward speeds. The extended retractable wing members allow the aircraft to have greater lifting surface for a rapid takeoff and the retracted wing members 73 provide less air resistance for the forward propulsion of the aircraft.

The aircraft preferably has the same number of forward propeller wells 21 as rear propeller wells 23 on each side of the central propeller well 22. The propeller wells 21 and 23 each contain two jet propelled helicopter propellers 45 and 45' (FIGURES 10 and 11) vertically spaced from one another and adapted to be contrarotating. The jet helicopter propellers are fed fuel by the fuel tanks through conduits 67 and compressed air from the compressors by conduit 74. The propellers are of the type which are described in my copending application Serial No. 267,570, filed on March 25, 1963. The propellers 45 and 45' are adapted to be contained within the top portion 29 of the fuselage which has a sufficient width to accommodate the rotation of said propellers. The fuselage lower portion 30 has a pair of longitudinally extending concave walls 75 extending the width of each propeller well which curves downwardly from the center of the fuselage to the top surface of the wing adjacent the inner portion of the vane passages 34. The walls 75 are similar to the concave walls 49 and 51. Also, connected to the concave surface 76 of the walls 75 and spaced therealong is a set of jet thrust augmenters 61 which receive compressed air through the conduits 60 from compressor. Each set of thrust augmenters is connected to a compressor which is positioned adjacent and between two propeller wells. The thrust augmenters have suitable ignition means for igniting fuel and the compressed air fed thereto.

Figure 11:
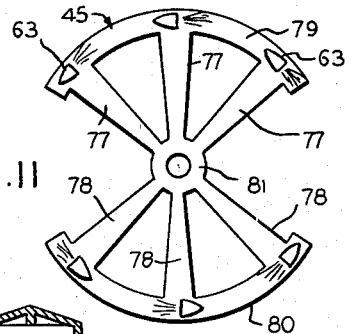
FIGURE 11 is a top view of the propellers constructed in accordance with the principles of the present invention.

The jet propeller, as is illustrated in FIGURE 11, has a plurality of blades 77 and 78 extending from a central hub 81 thereof and forming two sets of blades. The two sets of blades are interconnected by arcuate lift members 79 and 80 that have jets 63 connected thereto. The arcuate lift members 79 and 80 are diametrically opposed to each other to provide propeller stability and to prevent vibration thereof.

In the central propeller well 22 there is contained a jet propelled propeller vapor condenser 46 of the type described in my copending application Serial No. 307,444, filed on September 9, 1963. The vapor condenser 46 is utilized to condense water vapors from its exhaust gases and provide my combination aircraft with its own supply of water which may be utilized for cooling and water injection purposes. The jet propelled vapor condenser propeller is located in the fuselage upper portion and the lower portion thereof has a pair of concave longitudinally extending walls 75 having curved surfaces 76 with a set of thrust augmenters 61. It is centrally located so that the accumulation of water from the exhaust gases will not affect the longitudinal equilibrium of the aircraft.

Figure 9:
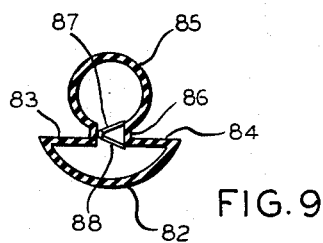
FIGURE 9 is a cross-sectional view of the landing support constructed in accordance with the principles of the present invention.
Figure 10:
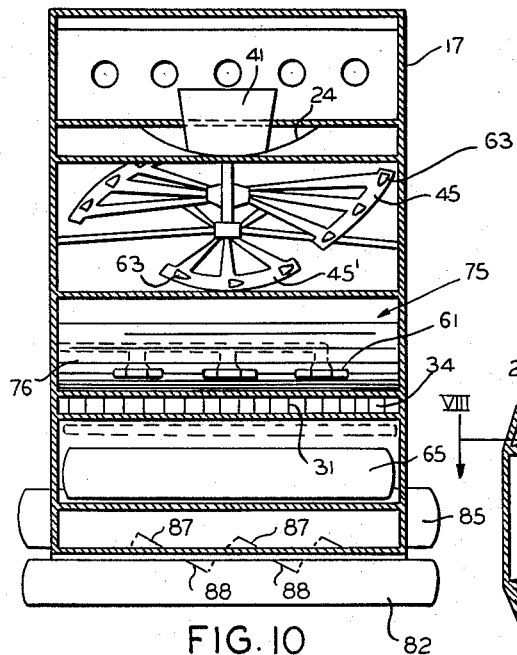
FIGURE 10 is a cross-sectional view taken with parts in elevation taken along lines X—X of FIGURE 2.
Figure 7:
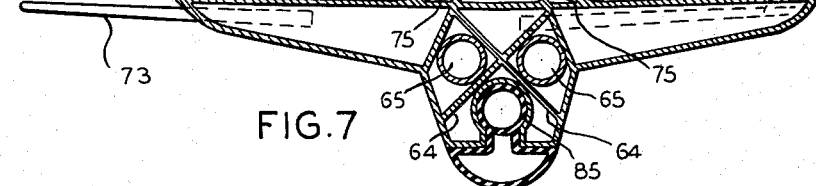
FIGURE 7 is a cross-sectional view with parts in elevation taken along lines VII—VII of FIGURE 2.
Figure 8:
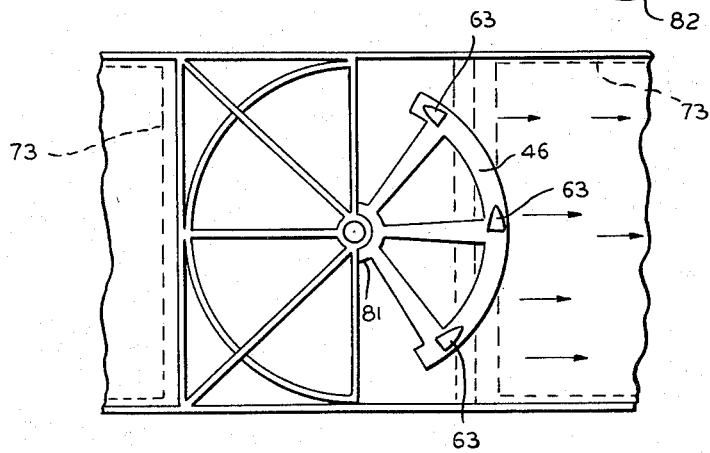
FIGURE 8 is a top view of the longitudinal cross-section with parts of FIGURE 7.
Figure 12:
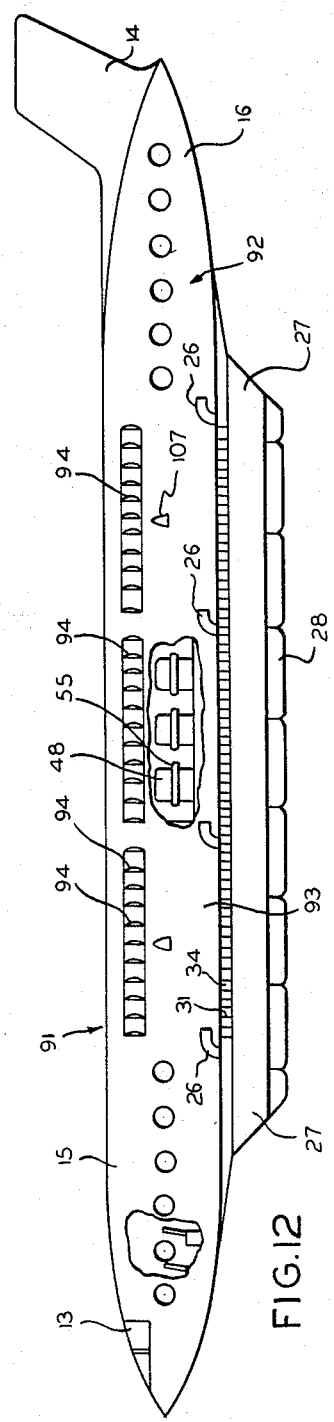
FIGURE 12 is an elevational side view with parts broken away illustrating another combination aircraft constructed in accordance with the principles of the present invention.
Figure 13:
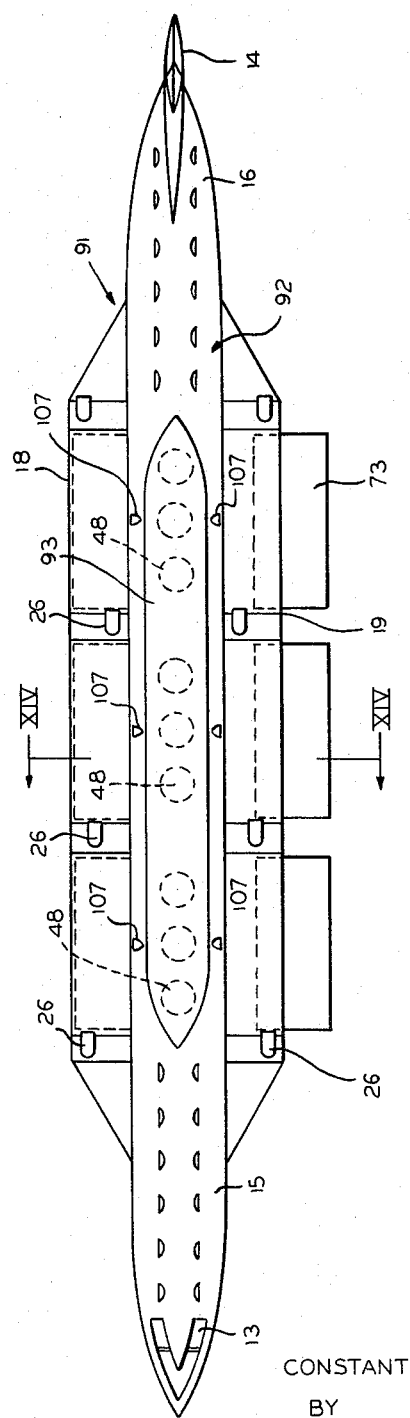
FIGURE 13 is a top plan view of the combination aircraft illustrated in FIGURE 12.
Figure 14:
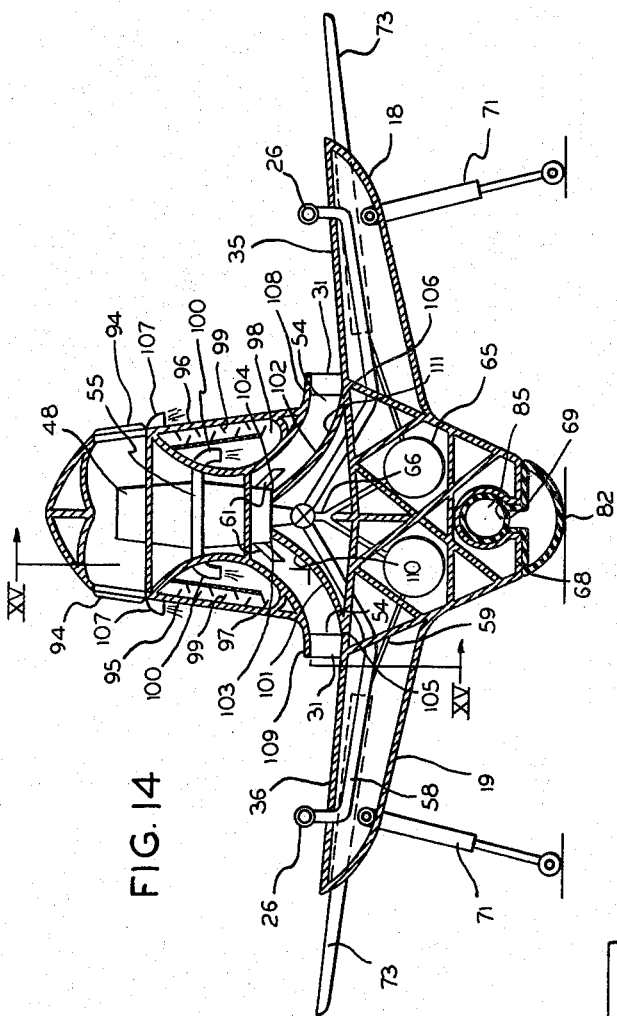
FIGURE 14 is a cross-sectional view with parts in elevation taken along lines XIV—XIV of FIGURE 13.
Figure 15:
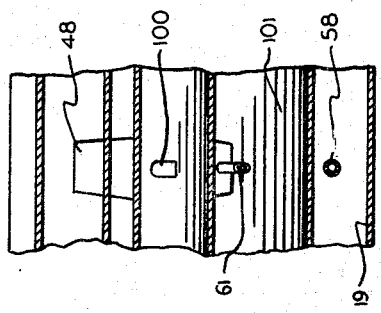
FIGURE 15 is a partial cross-sectional view with parts in elevation taken along lines XV—XV of FIGURE 14.

Referring to FIGURES 4, 7 and 9 there is illustrated the pontoon landing support members 28 of the present invention. The pontoon landing members 28 extend along the length of the keel 27 and each has a semi-cylindrical lower section 82 having longitudinally extending top walls 83 and 84 extending radially inwardly towards each other, a spherical top portion 85 which is adapted to be contained within the keel spherical chamber 69, and a neck 86 interconnecting and communicating the top and lower portions of the landing pontoon. A non-return valve member 87 and a non-return valve member 88 are connected in the upper and lower portions respectively. The valve members 88 and 87 are set to open at predetermined pressures and normally, they maintain the pressure in the top portion equal to the pressure in the lower portion. Therefore, when the plane lands, the pressure in the lower portion tends to be increased due to the compression thereof and causes air to open the valve 87 and flow into the top portion. However, the increase of pressure in the top portion causes the valve member 88 to open and return the excess air to the pontoon lower portion 82. This use of double acting valves causes the aircraft to land with less jarring and the pontoon to be automatically stabilized.

In operation, the propellers in the compressors are started with a valve means which may be suitably operated by suitable remote control means that opens the valve to deliver fuel to the propeller jets and closes the conduit suitable valve means that prevents fuel from being fed to the jets 26. Upon the rotation of the propellers and the ignition of the compressors, exhaust gases are directed by the conduit tubes 56 onto the surfaces 52 in the compressor chambers through the directing passages 31 which have their axis perpendicular to the longitudinal axis of the fuselage. The air simultaneously drawn inwardly by the propellers is directed downwardly onto the curved surfaces 76 and out through the directing passages along with exhaust gases which are directed onto the lower portion of the curved surfaces by the thrust augmenters 61. The propeller passage 22 may also have high velocity gas passing over its curved surface by the thrust augmenters 62 therein and to a minor extent by its rotating jet propelled vapor condenser which directs air downwardly onto the curved surfaces. The gases which flow through the directing passages 31 flow transversely over the tops of the wings which have their wing members 73 expanded. The high velocity gases pass over the tops of the wings to reduce the air pressure on the top surface of the wings. By reducing the air pressure on the top surface of the wings, there is created a pressure differential between the top and bottom surface of the wings. This pressure differential provides an upward force on the bottom of the wings to raise the aircraft vertically. When it is desired to hover the vehicle forward or backward, the directing vanes on each side of the fuselage may be selectively pivoted so as to provide a forward or rearward thrust.

When the aircraft has reached a desired vertical height, the fuel and compressed air conduits 59 and 58 are open to allow the jets 26 to start up. Once the jets 26 are started, the aircraft may fly in the normal manner of an airplane and the conduits directing air and fuel to the propellers may be reduced or stopped if desired, and also, if desired, the operation of the jet propelled vapor condenser may continue in order to provide sufficient water for cooling and water injection for the combination aircraft. The continuous operation of the propellers of course, depends on the wing design chosen.

Referring to FIGURES 12-15 there is illustrated the preferred embodiment of the present invention. In this embodiment there are parts which are identical to the aircraft 11 and therefore they bear the same reference numeral and unless otherwise indicated they operate in the same manner. This embodiment has a combination aircraft 91 with a streamlined contoured fuselage 92 that reduces the air resistance thereof. The combination aircraft 91 has a front pressurized passenger cabin 15 communicating with the pressurized cockpit 13, and a rear pressurized passenger cabin 16 with a tail 14 extending from the end thereof, and a central power supply portion 93. The fuselage has connected to the bottom portion thereof a keel member 27 having a plurality of pontoon landing supports 28 connected to the bottom thereof. Between the keel support and the bottom of the fuselage there extends the wings 18 and 19 which have retractible wing members 73 slidably connected therein and connected to the wings are staggered jets 26 which propel the aircraft in a forward direction. Along the upper central power portion of the fuselage are a plurality of scoops 94 that are utilized to scoop atmospheric air into the central portion of the fuselage and into the plurality of vertical axial compressors 48 suitably vertically mounted within the power portion of the fuselage.

Along the inner surfaces of the side walls 95 and 96 of the fuselage power supply portion are water condenser chambers 97 and 98 respectively. The longitudinally extending condensing chambers have condensing plates 99 suitably mounted therein. The exhaust from the compressors are collected by the collector ring 55 and delivered to both of the water condenser chambers 97 and 98 by conduits 100. The exhaust air is cooled and water vapor is condensed by the condensers.

A pair of longitudinally extending concave side walls 101 and 102 have their one ends 103 and 104 respectively connected adjacent the bottom of the compressors and extends downwardly from said one ends 103 and 104 and curves outwardly to their other ends 105 and 106 connected to the top surfaces 35 and 36 of the wings adjacent the inner surface 54 of the directing passages 34. Connected to each of the air compressors are two thrust augmenters 61 with one thrust augmenter directing its exhaust gases onto its adjacent curved surface 110 and the other thrust augmenter 61 directing its exhaust gases onto its adjacent curved surface 111. The directing passages normally have their axis perpendicular to the axis of the aircraft and also, the compressors are longitudinally spaced along the axis of the aircraft. The number of compressors depends upon the weight of the aircraft and the amount of lift desired.

A plurality of air exhaust means 107 are pivotally connected to the outer sides of the fuselage and communicates with the condenser chambers 97 and 98. The exhausts 107 directs the condensed air from the condensers down the outer sides of the fuselage and onto lower outer concave curved surfaces 108 and 109 that also directs the air transversely across the wing top surfaces 35 and 36.

In operation, the compressors 48 are ignited and air is drawn into the compressor through the intake scoops and compressed. The compressed air is delivered to the thrust augmenters 61 which direct the compressed air onto the curved surfaces 110 and 111 which directs the gases transversely across the respective top surfaces of the wings. The high velocity gas streams transversely flow across the top surfaces of the expanded wings causes a differential in air pressure between the top and bottom of the wings with the greater air pressure being exerted against the undersurface of the wings. Therefore, the aircraft is lifted vertically off the ground. When the combination aircraft reaches a desired height, the jets 26 are ignited and the wing members retracted and the aircraft operated in the normal manner of an airplane with suitable valve means to reduce or stop the delivery of compressed air to the augmenters if desired.

An aircraft, as has been described, is capble of effectively utilizing a major portion of the volume of exhaust gases to lift the aircraft. In the normal jet operation, where the jets direct their exhaust downwards, a large percentage of the jet engine exhaust gases are not utilized and thereby creates a certain amount of inefficiency. However, all the exhaust gases of the compressors as well as the air directed by the helicopter propellers are utilized in the embodiments illustrated by the present invention.

It is seen where I have provided an improved combination aircraft which utilizes the wing area to vertically move the aircraft. It is of course understood that modifications and variations of the present invention may be effected without departing from the spirit and scope of the present invention.

Therefore, it is understood that the above embodiments of my invention have been used for illustrative purposes only and the scope of my invention is set forth in the herein appended claims.

I claim as my invention:

1. A combination transport aircraft capable of vertical take-off comprising:
   a fuselage having a central power portion,
   a pair of wings with one wing projecting from each side wall of the fuselage and extending the length of the central power portion thereof,
   means forming a plurality of directing passages above the top surfaces of the wings,
   said directing passages normally having their axis perpendicular to the fuselage axis to direct fluid transversely over the top surfaces of the wings,
   a pair of longitudinally extending concave directing surfaces mounted in the fuselage with their concave surfaces facing in opposite directions and towards the sides of the fuselage,
   one end of each concave surface being connected to the inner end of one group of directing passages and the other end of each concave surface being connected above the top surfaces of the wings within the fuselage power portion, and
   means to deliver air to the concave surfaces to have said air directed through the directing passages
   whereby air delivered through the directing passages flows transversely across the top surfaces of the wings to reduce the pressure thereon to permit the aircraft to be vertically raised and lowered.

2. A combination transport aircraft capable of vertical take-off comprising:
   a fuselage having a central power portion,
   a pair of wings projecting from each side wall of the fuselage and longitudinally extending along the central power portion thereof,
   a plurality of pivotal vanes connected to the top surfaces of the wings and the fuselage power portion,
   said vanes forming a plurality of directing passages normally having their axis perpendicular to the fuselage axis to direct fluid transversely over the top surfaces of the wings,
   a pair of longitudinally extending concave directing surfaces mounted in the fuselage with their concave surfaces facing towards the sides of the fuselage,
   one end of each concave surface being connected to the inner end of the directing passages and the other end of each concave surface being connected above the top surfaces of the wings within the fuselage power portion, and
   means to deliver air to the concave surfaces to direct said air through the directing passages
   whereby air delivered through the directing passages flows transversely across the top surfaces of the wings to reduce the pressure thereon to permit the aircraft to be vertically raised and lowered.

3. A combination transport aircraft capable of vertical take-off and forward propulsion comprising:
   a fuselage having a central power portion,
   a pair of wings with one wing projecting from each side wall of the fuselage and longitudinally therealong,
   a plurality of pivotal vanes connected to the top surfaces of the wings and the fuselage power portion,
   said vanes forming a plurality of directing passages normally having their axis perpendicular to the fuselage axis to direct fluid transversely over the top surfaces of the wings,
   a pair of longitudinally extending concave directing surfaces mounted in the fuselage with their concave surfaces facing in opposite directions and towards the sides of the fuselage,
   one end of each concave surface being connected to the inner end of the directing passages and the other end of each concave surface being connected above the top surfaces of the wings within the fuselage power portion,
   means to deliver air to the concave surfaces to direct said air through the directing passages, and
   a plurality of jet engines connected to the wings to provide forward propulsion
   whereby air delivered through the directing passages flows transversely across the top surfaces of the wings to reduce the pressure thereon to permit the aircraft to be vertically raised and lowered.

4. A combination transport aircraft capable of vertical take-off and forward propulsion comprising:
   a fuselage having a central power portion,
   a plurality of wells formed in the fuselage power portion,
   said wells having an open end through the top of the fuselage to allow atmospheric air to enter therethrough,
   a pair of wings with one wing projecting from each side wall of the fuselage and longitudinally extending therealong,
   a plurality of jet engines mounted on each wing to provide forward propulsion,
   a plurality of pivotal vanes connected to the top surfaces of the wings and the fuselage power portion,
   said vanes forming a plurality of directing passages normally having their axis perpendicular to the fuselage axis to direct fluid transversely over the top surfaces of the wings,
   a pair of longitudinally extending concave directing surfaces mounted in the fuselage with their concave surfaces facing in opposite directions and towards the sides of the fuselage,
   one end of each concave surface being connected to the inner end of the directing passages and the other end of each concave surface being connected above the top surfaces of the wings within the fuselage power portion,
   a plurality of vertically extending axial compressors located in the fuselage walls, and
   conduit means communicating each compressor with a compressor exhaust for directing compressed air onto the concave surfaces to deliver air to the directing passages,
   whereby air delivered through the directing passages flows transversely across the top surfaces of the wings to reduce the pressure thereon to permit the aircraft to be vertically raised and lowered.

5. A combination transport aircraft capable of vertical take-off and forward propulsion comprising:
   a fuselage having a front and rear pressurized cabin and a central power portion between said front and rear cabins,
   a plurality of wells formed in the fuselage power portion,
   said wells having an open end through the top of the fuselage to allow atmospheric air to enter therethrough,
   a plurality of compressors mounted in said fuselage power portion wells,
   a pair of wings with one wing projecting from each side wall of the fuselage and longitudinally extending therealong,
   said wings taving expandible wing members that are adapted to be expanded and retracted to increase and decrease the wing surface of the aircraft as desired, a plurality of jet engines mounted on each wing to provide forward propulsion, a plurality of pivotal vanes connected to the top surfaces of the wings and the fuselage power portion, said vanes forming a plurality of directing passages normally having their axis perpendicular to the fuselage axis to direct fluid transversely over the top surfaces of the wings, a pair of longitudinally extending concave directing surfaces mounted in the wells with their concave surfaces facing in opposite directions and towards the sides of the fuselage, one end of each concave surface being connected to the inner end of the directing passages and the other end of each concave surface being connected above the top surfaces of the wings adjacent the axis of the wells, thrust augmenters mounted within each well and adapted to deliver air to the concave surfaces therein, conduit means communicating the compressors with the thrust augmenters to deliver compressed air thereto whereby air delivered to the thrust augmenters flows through the directing passages and transversely across the top surfaces of the wings to reduce the pressure thereon to permit the aircraft to be vertically raised and lowered.

6. A combination transport aircraft capable of vertical take-off and forward propulsion comprising:

a fuselage having a front and rear pressurized cabin and a central power portion between said front and rear cabins, a plurality of wells formed in the fuselage power portion, said wells having an open end through the top of the fuselage to allow atmospheric air to enter therethrough, a plurality of compressors mounted in said fuselage power portion wells, a pair of wings with one wing projecting from each side wall of the fuselage and longitudinally extending therealong, said wings having expandible wing members that are adapted to be expanded and retracted to increase and decrease the wing surface of the aircraft as desired, each wing having connected thereto at least one extensible balancing support means, a longitudinally extending keel base connected to the bottom of the fuselage below said wings, said keel base having an end wall, a longitudinally extending cylindrical housing having a longitudinal open neck formed in said keel with the neck being formed in the keel end wall, a plurality of inflatable pontoon supports, said pontoon supports each having a cylindrical top portion, a semi-cylindrical base portion, and a neck portion joining said top and bottom portion, valve means communicating each pontoon base portion with the top portion to allow fluid to selectively flow between the base and top portions, said pontoons having their cylindrical top portions mounted in said cylindrical keel housing with their bottom portion being utilized to support the aircraft, a plurality of fuel containers mounted in said keel, a plurality of jet engines mounted on each wing, a plurality of pivotal vanes connected to the top surfaces of the wings and the fuselage power portion, said vanes forming a plurality of directing passages normally having their axis perpendicular to the fuselage axis to direct fluid transversely over the top surfaces of the wings, a pair of longitudinally extending concave directing surfaces mounted in the wells with their concave surfaces facing in opposite directions and towards the sides of the fuselage, one end of each concave surface being connected to the inner end of the directing passages and the other end of each concave surface being connected above the top surfaces of the wings adjacent the axis of the wells, at least one set of thrust augmenters mounted within each well and adapted to deliver air to the concave surfaces therein, conduit means communicating the compressors with the thrust augmenters to deliver compressed air thereto, conduits communicating the fuel tanks with the jet engines to supply fuel thereto, and conduits communicating the fuel tanks with the jet contrarotating helicopter propellers and the jet vapor condenser propeller to supply fuel thereto whereby air delivered to the thrust augmenters, flows through the directing passages and transversely across the top surfaces of the wings to reduce the pressure thereon to permit the aircraft to be vertically raised and lowered.

7. A combination transport aircraft capable of vertical take-off and forward propulsion comprising:

a fuselage having a front and rear pressurized cabin and a central power portion between said front and rear cabins, a plurality of propeller wells formed in the fuselage power portion, said wells having an open end through the top of the fuselage to allow atmospheric air to enter therethrough, a pair of wings with one wing projecting from each side wall of the fuselage and longitudinally extending therealong, a plurality of jet engines mounted on each wing, a plurality of vanes connected to the top surfaces of the wings and the fuselage power portion, said vanes forming a plurality of directing passages normally having their axis perpendicular to the fuselage axis to direct fluid transversely over the top surfaces of the wings, jet helicopter propellers rotatably mounted in the fuselage power wells, a pair of longitudinally extending concave directing surfaces mounted in each propeller well with their concave surfaces facing in opposite directions and towards the sides of the fuselage, one end of each concave surface being connected to the inner end of the directing passages and the other end of each concave surface being connected above the top surfaces of the wings and under the propeller, and said propellers delivering air to the concave surfaces whereby air delivered to the concave surfaces flows through the directing passages and transversely across the top surfaces of the wings to reduce the pressure thereon to permit the aircraft to be vertically raised and lowered.

8. A combination transport aircraft capable of vertical take-off and forward propulsion comprising:

a fuselage having a front and pressurized cabin and a central power portion between said front and rear cabins, a plurality of propeller wells formed in the fuselage power portion, said wells having an open end through the top of the fuselage to allow atmospheric air to enter therethrough, a pair of wings with one wing projecting from each side wall of the fuselage and longitudinally extending therealong, said wings having expandible wing members that are adapted to be expanded and retracted to increase and decrease the wing surface of the aircraft as desired, a plurality of jet engines mounted on each wing to provide forward propulsion, a plurality of pivotal vanes connected to the top surfaces of the wings and the fuselage power portion, said vanes forming a plurality of directing passages normally having their axis perpendicular to the fuselage axis to direct fluid transversely over the top surfaces of the wings, a pair of jet contrarotating helicopter propellers rotatably mounted in the fuselage power wells, a pair of longitudinally extending concave directing surfaces mounted in each propeller well with their concave surfaces facing in opposite directions and towards the sides of the fuselage, one end of each concave surface being connected to the inner end of the directing passages and the other end of each concave surface being connected above the top surfaces of the wings within the fuselage power portion under the jet propellers, said propellers delivering air to the concave surfaces whereby air delivered to the concave surfaces flows through the directing passages and transversely across the top surfaces of the wings to reduce the pressure thereon to permit the aircraft to be vertically raised and lowered.

9. A combination transport aircraft capable of vertical take-off and forward propulsion comprising:

a fuselage having a front and rear pressurized cabin and a central power portion between said front and rear cabins, a plurality of propeller wells formed in the fuselage power portion, said wells having an open end through the top of the fuselage to allow atmospheric air to enter therethrough, a plurality of compressor compartments formed in said fuselage power portion, said compressor compartments having an open end through the fuselage, a pair of wings with one wing projecting from each side wall of the fuselage and extending at least the length of the central power portion thereof, said wings having expandible wing members that are adapted to be expanded and retracted to increase and decrease the wing surface of the aircraft as desired, a plurality of jet engines mounted on each wing to provide forward propulsion, a plurality of pivotal vanes connected to the top surfaces of the wings and the fuselage power portion, said vanes forming a plurality of directing passages normally having their axis perpendicular to the fuselage axis to direct fluid transversely over the top surfaces of the wings, jet helicopter propellers rotatably mounted in the fuselage power wells, a pair of longitudinally extending concave directing surfaces mounted in each propeller well with their concave surfaces facing in opposite directions and towards the sides of the fuselage, one end of each concave surface being connected to the inner end of the directing passages and the other end of each concave surface being connected above the top surfaces of the wings within the fuselage power portion under the jet propellers, thrust augmenters mounted within each well and adapted to deliver air to the curved surfaces therein, axial compressors located in each compressor compartment, first conduit means communicating the compressors with the thrust augmenters, second conduit means communicating the compressors with the jet engines to supply compressed air thereto, third conduit means communicating the compressors with the jet contrarotating helicopter propellers to supply compressed air thereto, and said jet propellers delivering air to the concave surfaces whereby air delivered to the concave surfaces flows through the directing passages and transversely across the top surfaces of the wings to reduce the pressure thereon to permit the aircraft to be vertically raised and lowered.

10. A combination transport aircraft capable of vertical take-off and forward propulsion comprising:

a fuselage having a front and rear pressurized cabin and a central power portion between said front and rear cabins, a plurality of propeller wells formed in the fuselage power portion, said wells having an open end through the top of the fuselage to allow atmospheric air to enter therethrough, a plurality of compressor compartments formed in said fuselage power portion, said compressor compartments having an open end through the top of the fuselage, a pair of wings with one wing projecting from each side wall of the fuselage and extending at least the length of the central power portion thereof, said wings having expandible wing members that are adapted to be expanded and retracted to increase and decrease the wing surface of the aircraft as desired, a plurality of jet engines mounted on each wing, a plurality of pivotal vanes connected to the top surfaces of the wings and the fuselage power portion, said vanes forming a plurality of directing passages normally having their axis perpendicular to the fuselage axis to direct fluid transversely over the top surfaces of the wings, a jet propelled vapor condenser in the central propeller well having its propeller rotatably mounted in the fuselage power portion, a pair of jet contrarotating helicopter propellers rotatably mounted in the other fuselage power wells, a pair of longitudinally extending concave directing surfaces mounted in each propeller well with their concave surfaces facing in opposite directions and towards the sides of the fuselage, one end of each concave surface being connected to the inner end of the directing passages and the other end of each concave surface being connected above the top surfaces of the wings within the fuselage power portion under the jet propellers, thrust augmenters mounted within each well and adapted to deliver air to the curved surfaces therein, axial compressors located in each compressor compartment, first conduit means communicating the compressors with the thrust augmenters, second conduit means communicating the compressors with the jet engines to supply compressed air thereto, third conduit means communicating the compressors with the jet contrarotating helicopter propellers and the jet vapor condenser propeller to supply compressed air thereto, and said jet propellers delivering air to the concave surfaces whereby air delivered to the concave surfaces flows through the directing passages and transversely across the top surfaces of the wings to reduce the pressure thereon to permit the aircraft to be vertically raised and lowered.

11. A combination transport aircraft capable of vertical take-off and forward propulsion comprising:

a fuselage having a front and rear pressurized cabin and a central power portion between said front and rear cabins, a plurality of propeller wells formed in the fuselage power portion,
said wells having an open end through the top of the fuselage to allow atmospheric air to enter therethrough,
a plurality of compressor compartments formed in said fuselage power portion,
said compressor compartments having an open end through the top of the fuselage,
a pair of wings with one wing projecting from each side wall of the fuselage and extending at least the length of the central power portion thereof,
said wings having expandible wing members that are adapted to be expanded and retracted to increase and decrease the wing surface of the aircraft as desired,
a plurality of jet engines mounted on each wing,
a plurality of pivotal vanes connected to the top surfaces of the wings and the fuselage power portion,
said vanes forming a plurality of directing passages normally having their axis perpendicular to the fuselage axis to direct fluid transversely over the top surfaces of the wings,
a jet propelled vapor condenser in the central propeller well having its propeller rotatably mounted in the fuselage power portion,
a pair of jet contrarotating helicopter propellers rotatably mounted in the other fuselage power wells with said propellers being in the top portion thereof,
a pair of longitudinally extending concave directing surfaces mounted in each propeller well with their concave surfaces facing in opposite directions and towards the sides of the fuselage,
one end of each concave surface being connected to the inner end of the directing passages and the other end of each concave surface being connected above the top surfaces of the wings within the fuselage power portion under the jet propellers,
thrust augmenters mounted within each well and adapted to deliver air to the curved surfaces therein,
vertically extending axial compressors located in each compressor compartment,
a second pair of longitudinally extending concave surfaces mounted in the compressor compartments with their concave surface facing in opposite directions and towards the sides of the fuselage and having their lower ends connected to the inner ends of adjacent directing passages and their upper ends connected within the fuselage above the wing top surfaces,
first conduit means communicating each compressor with the thrust augmenters,
second conduit means communicating each compressor with a compressor exhaust for directing compressed air onto the second concave surfaces,
third conduit means communicating the compressors with the jet engines to supply compressed air thereto,
fourth conduit means communicating the compressors with the jet contrarotating helicopter propellers and the jet vapor condenser propeller to supply compressed air thereto,
said jet propellers delivering air to the concave surfaces whereby air delivered to the concave surfaces flows through the directing passages and transversely across the top surfaces of the wings to reduce the pressure thereon to permit the aircraft to be vertically raised and lowered.

12. A combination transport aircraft capable of vertical take-off and forward propulsion comprising:
a fuselage having a front and rear pressurized cabin and a central power portion between said front and rear cabins,
a plurality of propeller wells formed in the fuselage power portion,
said wells having an open end through the top of the fuselage to allow atmospheric air to enter therethrough,
a plurality of compressor compartments formed in said fuselage powder portion with one propeller well being between at least two compressor compartments,
said compressor compartments having an open end through the top of the fuselage,
a pair of wings with one wing projecting from each side wall of the fuselage and extending at least the length of the central power portion thereof,
said wings having expandible wing members that are adapted to be expanded and retracted to increase and decrease the wing surface of the aircraft as desired,
each wing having connected thereto at least one extensible balancing support means,
a longitudinally extending keel base connected to the bottom of the fuselage below said wings,
said keel base having an end wall,
a longitudinal extending cylindrical housing having a longitudinal open neck formed in said keel with the neck being formed in the keel end wall,
a plurality of inflatable pontoon supports,
said pontoon supports each having a cylindrical top portion,
a semi-cylindrical base portion, and a neck portion joining said top and bottom portion,
valve means communicating each pontoon base portion with the top portion to allow fluid to selectively flow between the base and top portions,
said pontoons having their cylindrical top portions mounted in said cylindrical keel housing with their bottom portion being utilized to support the aircraft,
a plurality of fuel containers mounted in said keel,
a plurality of jet engines mounted on each wing,
a plurality of vanes connected to the top surfaces of the wings and the fuselage powder portion,
said vanes forming a plurality of directing passages normally having their axis perpendicular to the fuselage axis to direct fluid transversely over the top surfaces of the wings,
jet helicopter propellers rotatably mounted in the other fuselage power wells,
a pair of longitudinally extending concave directing surfaces mounted in each propeller well with their concave surfaces facing in opposite directions and towards the sides of the fuselage,
one end of each concave surface being connected to the inner end of the directing passages and the other end of each concave surface being connected above the top surfaces of the wings within the fuselage power portion under the jet propellers,
thrust augmenters mounted within each well and adapted to deliver air to the curved surfaces therein,
axial compressors located in each compressor compartment,
first conduit means communicating the compressors with the thrust augmenters,
second conduit means communicating the compressors with the jet engines to supply compressed air thereto,
third conduit means communicating the compressors with the jet contrarotating helicopter propellers to supply compressed air thereto,
said jet propellers delivering air to the concave surfaces,
whereby air delivered to the concave surfaces flows through the directing passages and transversely across the top surfaces of the wings to reduce the pressure thereon to permit the aircraft to be vertically raised and lowered.

13. A combination transport aircraft capable of vertical take-off and forward propulsion comprising:
a fuselage having a front and rear pressurized cabin and a central power portion between said front and rear cabins,
a plurality of propeller wells formed in the fuselage power portion with an inner diameter substantially equal to the inner diameter of the fuselage, said wells having an open end through the top of the fuselage to allow atmospheric air to enter therethrough, a plurality of compressor compartments formed in said fuselage power portion with one propeller well being between at least two compressor compartments, said compressor compartments having an open end through the top of the fuselage, a pair of wings with one wing projecting from each side wall of the fuselage and extending at least the length of the central power portion thereof, said wings having expandible wing members that are adapted to be expanded and retracted to increase and decrease the wing surface of the aircraft as desired, each wing having connected thereto at least one extensible balancing support means, a longitudinally extending keel base connected to the bottom of the fuselage below said wings, said keel base having a frusto-triangular transverse cross-section with the base thereof connected to the fuselage bottom and the frusto-apex forming the bottom end wall of the aircraft, a longitudinal extending cylindrical housing having a longitudinal open neck formed in said keel with the neck being formed in the keel apex end wall, a plurality of inflatable pontoon supports, said pontoon supports each having a cylindrical top portion, a semi-cylindrical base portion, and a neck portion joining said top and bottom portion, at least one first pressure relief valve communicating each pontoon base portion with the pontoon top portion to allow fluid to flow only from the base portion to the top portion after a predetermined pressure, at least one second pressure relief valve communicating each pontoon top portion with the pontoon base portion to allow fluid to flow only from the top portion of the base portion above a predetermined pressure, said first and second relief valves being set to relieve the same amount of pressure, said pontoons having their cylindrical top portions mounted in said cylindrical keel housing with their bottom portion being utilized to support the aircraft, a plurality of fuel containers mounted in said keel, a plurality of jet engines mounted on each wing, a plurality of pivotal vanes connected to the top surfaces of the wings and the fuselage power portion, said vanes forming a plurality of directing passages normally having their axis perpendicular to the fuselage axis to direct fluid transversely over the top surfaces of the wings, said fuselage power portion having an enlarged top portion and a converging bottom portion with the directing passages being formed in the bottom portion thereof, a jet propelled vapor condenser in the central propeller well having its propeller rotatably mounted in the fuselage power top portion, a pair of jet contrarotating helicopter propellers rotatably mounted in the other fuselage power wells with said propellers being in the top portion thereof, a pair of longitudinally extending concave directing surfaces mounted in each propeller well with their concave surfaces facing in opposite directions and towards the sides of the fuselage, one end of each concave surface being connected to the inner end of one group of directing passages and the other end of each concave surface being connected above the top surfaces of the wings within the fuselage power portion, at least one set of thrust augmenters mounted within each well and adapted to deliver air to the curved surfaces therein, at least one vertically extending axial compressor located in each compressor compartment, a second pair of longitudinally extending concave surfaces mounted in the compressor compartment with their concave surfaces facing in opposite directions and towards the sides of the fuselage and having their lower end connected to the inner end of adjacent directing passages with their upper end connected within the fuselage above the wing top surfaces, first conduits communicating each compressor with at least one set of thrust augmenters, second conduits communicating each compressor with a compressor exhaust for directing compressed air onto the second concave surfaces, third conduits communicating the compressor with the jet engines to supply compressed air thereto, fourth conduits communicating the compressors with the jet contrarotating helicopter propellers and the jet vapor condenser propeller to supply compressed air thereto, conduits communicating the fuel tanks with the jet engines to supply fuel thereto, and conduits communicating the fuel tanks with the jet contrarotating helicopter propellers and the jet vapor vapor condenser propeller to supply fuel thereto whereby air delivered through the directing passages flows transversely across the top surfaces of the wings to reduce the pressure thereon to permit the aircraft to be vertically raised and lowered.

14. In combination with a transport aircraft having a fuselage and wings:

a longitudinally extending keel base connected to the bottom of the fuselage below said wings, said keel base having an end wall, a longitudinally extending cylindrical housing having a longintudinal open neck formed in said keel with the neck being formed in the keel end wall, a plurality of inflatable pontoon supports, said pontoon supports each having a cylindrical top portion, a semi-cylindircal base portion, and a neck portion joining said top and bottom portion, valve communicating each pontoon base portion with the top portion to allow fluid to selectively flow between the base and top portion, and said pontoons having their cylindrical top portions mounted in said cylindrical keel housing with their bottom portion being utilized to support the aircraft.

15. In combination with an aircraft having a fuselage and wings:

a longitudinally extending keel base connected to the bottom of the fuselage below said wings, said keel base having a frusto-triangular transverse cross-section with the base thereof connected to the fuselage bottom and the frusto-apex forming the bottom end wall of the aircraft, a longitudinally extending cylindrical housing having a longitudinal open neck formed in said keel with the neck being formed in the keel apex end wall, a plurality of inflatable pontoon supports, said pontoon supports each having a cylindrical top portion, a semi-cylindrical base portion, and a neck portion joining said top and bottom portion, at least one first pressure relief valve communicating each pontoon base portion with the top portion to allow fluid to flow only from the base portion to the top portoin after a predetermined pressure, at least one second pressure relief valve communicating each pontoon top portion with the base portion to allow fluid to flow only from the top portion to the base portion above a predetermined pressure, and said pontoons having their cylindrical top portions mounted in said cylindrical keel housing with their bottom portion being utilized to support the aircraft.

16. In combination with transport aircraft having a fuselage, a pair of wings and capable of vertical take-off and forward propulsion:

a longitudinally extending keel base connected to the bottom of the fuselage below said wings, said keel base having a frusto-triangular transverse cross-section with the base thereof connected to the fuselage bottom and the frusto-apex forming the bottom end wall of the aircraft, a longitudinally extending cylindrical housing having a longitudinal open neck formed in said keel with the neck being formed in the keel apex end wall, a plurality of inflatable pontoon supports, said pontoon supports each having a cylindrical top portion, a semi-cylindrical base portion, and a neck portion joining said top and bottom portion, at least one first pressure relief valve communicating each pontoon base portion with the top portion to allow fluid to flow only from the base portion to the top portion after a predetermined pressure, at least one second pressure relief valve communicating each pontoon top portion with the base portion to allow fluid to flow only from the top portion to the base portion above a predetermined pressure, said first and second relief valves being set to relieve the same amount of pressure, and said pontoons having their cylindrical top portions mounted in said cylindrical keel housing with their bottom portion being utilized to support the aircraft.

17. A combination transport aircraft capable of vertical take-off comprising:

a fuselage having a central power portion, wing means having a wing portion projecting from each side of the fuselage and said wing means extending substantially the length of the central power portion, means connected to the central power portion forming a plurality of directing passages above the top surfaces of the wings such that said directing passages normally have their axes at an angle to the fuselage axis to direct fluid transversely over the top surfaces of the wings, a pair of concave directing surfaces attached to the fuselage with their concave surfaces facing in opposite directions and towards the sides of the fuselage, one end of each concave surface being connected to the inner end of one group of directing passages and the other end of each concave surface being connected above and between the projecting wing portions, and means to deliver air to the concave surfaces to have said air directed through the directing passages whereby air delivered through the directing passages flows transversely across the top surfaces of the wings to reduce the pressure thereon to permit the aircraft to be vertically raised and lowered.

18. A combination transport aircraft capable of vertical take-off comprising:

a fuselage having a central power portion, a pair of wings projecting from each side wall of the fuselage and longitudinally extending along the central power portion thereof, a plurality of vanes connected to the top surfaces of the wings and the fuselage power portion, said vanes forming a plurality of directing passages normally having their axes at an angle to the fuselage axis to direct fluid transversely over the top surfaces of the wings, a pair of longitudinally extending concave directing surfaces mounted to the fuselage and having concave surfaces facing towards the sides of the fuselage, one end of each concave surface being connected to the inner end of the directing passages and the other end of each concave surface being above the top surfaces of the wings, and means to deliver air to the concave surfaces to direct said air through the directing passages whereby air delivered through the directing passages flows transversely across the top surfaces of the wings to reduce the pressure thereon to permit the aircraft to be vertically raised and lowered.

References Cited in the file of this patent
UNITED STATES PATENTS

| | | |
|---|---|---|
| 2,334,070 | Conley | Nov. 9, 1943 |
| 2,711,868 | Parker | June 28, 1955 |